Feb. 27, 1923.
J. H. ROWLAND
1,446,811
WORK HOLDING CLAMP
Filed Mar. 10, 1921
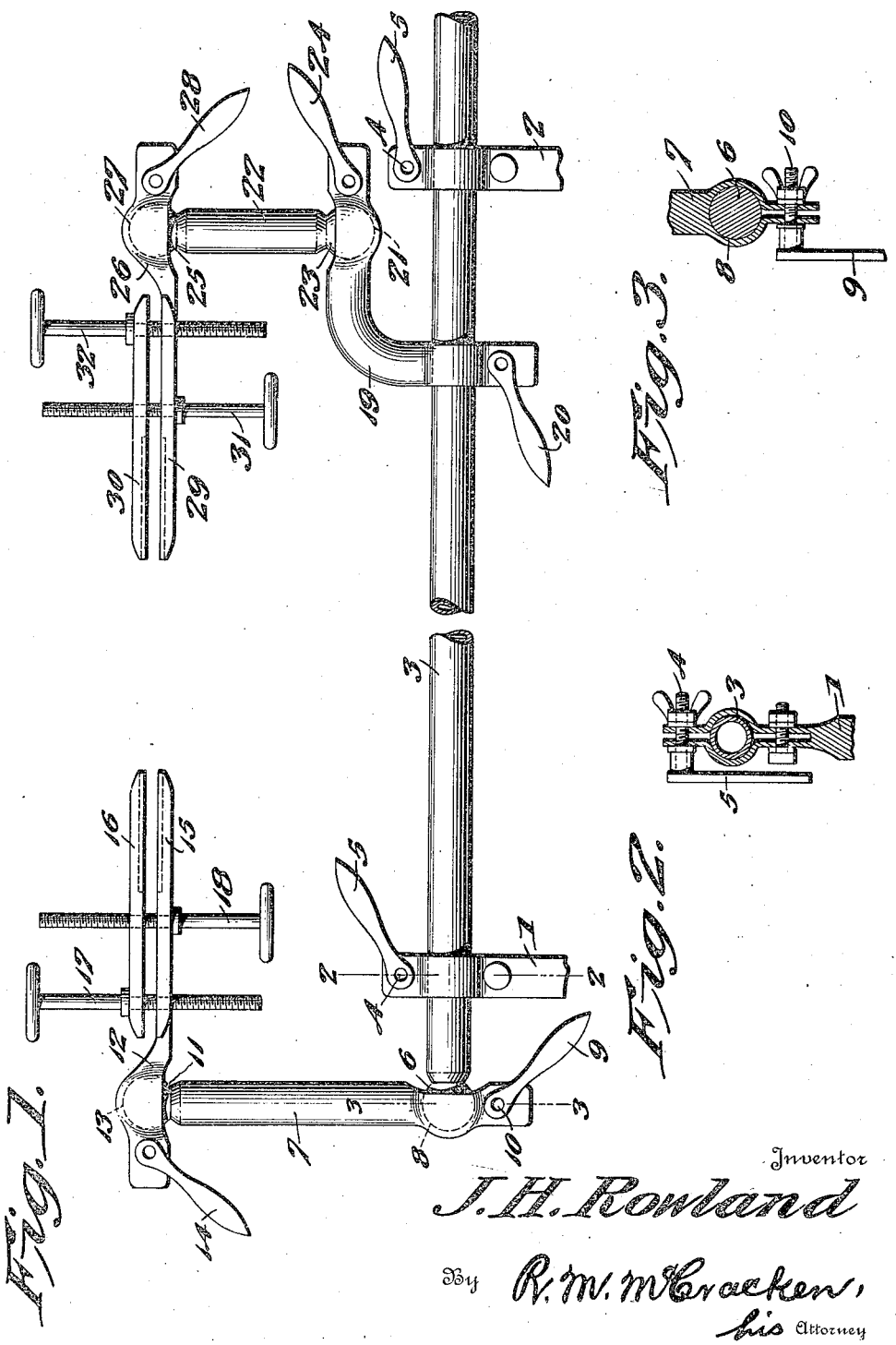
Inventor
J. H. Rowland
By R. M. McCracken,
his Attorney Patented Feb. 27, 1923.

1,446,811

UNITED STATES PATENT OFFICE.

J H ROWLAND, OF BLACKFOOT, IDAHO.

WORK-HOLDING CLAMP.

Application filed March 10, 1921. Serial No. 451,160.

*To all whom it may concern:*

Be it known that I, J H ROWLAND, resident of Blackfoot, Bingham County, State of Idaho, citizen of the United States, have invented certain new and useful Improvements in Work-Holding Clamps, of which the following is a specification.

This invention relates to work holding clamps, and particularly to an adjustable clamp for use by welders and the like.

An object is to provide a clamp structure which can be adjusted and extended to hold any part of an automobile or any twisted piece of metal in place while the same is being welded or otherwise worked upon.

A further object is to so construct the parts that a multiplicity of adjustments is provided for, thus adapting the device for use with the holding clamps in any desired position.

A still further object lies in providing locking means at each point of adjustment to positively hold the parts against loosening or shifting under vibration or through other causes.

With these and other objects in view which will be apparent from the specification, drawings, and claims, this invention includes certain novel features of construction and combinations of parts which will now be set forth.

In the drawings:

Figure 1 is a view in elevation of the device of my invention.

Fig. 2 is a sectional view on line 2—2 of Fig. 1.

Fig. 3 is a detail sectional view on the line 3—3 of Fig. 1.

The stationary supporting brackets 1 and 2 are adapted to be mounted on a bench or other suitable support, and these brackets have openings through which a supporting rod or pipe 3 is slidably mounted. The supporting brackets are split and clamping bolts 4 and clamping handles 5 are provided to tighten the split portions around the supporting rod 3, as best shown in Fig. 2, to positively grip and rigidly hold the supporting rod in adjusted positions.

The supporting rod 3 has a spherical head or ball 6 at one end and a supporting standard 7 is provided with a socket 8 in which this head or ball is received, the socket portion being split and a handle 9 being fitted upon clamp bolt 10 to tighten the socket portion upon the ball head, this structure being best shown in Fig. 3.

At its free end, supporting standard 7 has a ball head 11, and a clamp member 12 is provided with a socket 13 to receive this ball, the clamp handle 14 being provided to tighten the socket upon the ball. The clamp member 12 has a jaw 15, and a clamp jaw 16 is disposed opposite this jaw 15, clamp screws 17 and 18 being provided to manipulate the jaws.

A substantially L-shaped bracket 19 is fitted slidably on supporting rod 3 and is clamped in set positions thereon by clamp handle 20. The extending arm of this bracket is parallel with the supporting rod and is provided with a socket 21, a supporting standard 22 having a ball head 23 which is received in the socket. A clamp handle 24 is provided to tighten the ball within the socket and hold the supporting standard in adjusted positions.

At its outer end supporting standard 22 has a ball head 25, and a clamp member 26 similar to member 12 is provided with a socket 27 to receive this ball. A clamp handle 28 is provided to tighten the socket portion upon the ball, and the clamp member 26 is provided with a gripping jaw 29 similar to jaw 15. A clamping jaw 30 is positioned opposite jaw 29 and clamp screws 31 and 32 are provided to manipulate these jaws.

The arrangement of the parts is preferably such that, as shown in Fig. 1, the two sets of jaws can be set to be in alinement to hold the two parts of a rod or similar broken straight piece which is to have its ends welded. However, by reason of the various joints and the fact that adjustment is universal upon the ball and socket joints the gripping jaws can be adjusted in any position to hold crooked or twisted pieces of metal in place while being welded, and through extension upon supporting rod 3 the gripping jaws can be extended to take and hold pieces of various lengths. The supporting rod and other portions will be made sufficiently strong and heavy to hold any part of an automobile or other piece of machinery, and pieces of any shape or form can be held in any position and at any angle while being welded or otherwise worked upon.

While in the foregoing I have described only one specific embodiment, and have mentioned only certain possible modifications, it will be appreciated that in practice I do not limit myself to such specific details as herein set forth, but may resort to any practical modifications falling within the scope of the invention as defined in the appended claims.

I claim:

1. A work holding clamp including, with a supporting rod having a ball head at one end, a supporting standard having a ball socket at one end and a ball at the remaining end, means to clamp the socket upon the ball head of the rod, a pair of gripping jaws fitted for universal adjustment on the ball of the standard, a bracket fitted on the supporting rod provided with a socket, a second pair of gripping jaws, and an intermediate member by which the second jaw is held for universal adjustment on the bracket socket.

2. A work holding clamp including with a supporting rod having a ball head at one end, a pair of supporting brackets in which said rod is adjustably mounted provided with means to clamp and hold the supporting rod in set positions, a supporting standard having a ball head at one end provided with a socket to fit the ball head of the supporting rod and clamping means to secure the supporting standard in adjusted positions with respect to the rod, a pair of gripping jaws fitted for universal adjustment on the ball head of the supporting standard and provided with clamping means to hold adjustments thereof, an L-shaped bracket fitted adjustably and settably on the supporting rod and provided with a ball socket, a second supporting standard provided with ball heads at both ends and having one head received within the ball socket of the bracket, means to rigidly hold said second supporting standard in adjusted positions with respect to the bracket, and a pair of gripping jaws fitted for universal adjustment on the ball head of the supporting standard and provided with clamping means to hold adjustments thereof.

In testimony whereof I hereunto affix my signature.

J. H. ROWLAND.